United States Patent [19]
Sheets et al.

[11] Patent Number: 5,444,776
[45] Date of Patent: Aug. 22, 1995

[54] BRIDGE FOR A NETWORK INTERFACE UNIT

[75] Inventors: Laurence L. Sheets, Woodridge; Daniel C. Peterson, St. Charles, both of Ill.

[73] Assignee: Teltrend Inc., St. Charles, Ill.

[21] Appl. No.: 151,505

[22] Filed: Nov. 12, 1993

[51] Int. Cl.⁶ .............................................. H04B 3/46
[52] U.S. Cl. .................................. 379/399; 379/5; 379/412; 370/85.6; 370/85.11
[58] Field of Search ...................... 379/399, 412, 5; 370/85.6, 85.11, 16, 60, 13

[56] References Cited
U.S. PATENT DOCUMENTS

| | | | |
|---|---|---|---|
| 3,568,100 | 3/1971 | Tarbos | 333/18 |
| 5,173,896 | 12/1992 | Dariano | 379/21 |
| 5,224,149 | 6/1993 | Garcia | 379/5 |

Primary Examiner—James L. Dwyer
Assistant Examiner—Jacques M. Saint-Surin
Attorney, Agent, or Firm—Banner & Allegretti, Ltd.

[57] ABSTRACT

A network interface unit interconnected between a network span and a customer premises. The network span includes network transmit lines and network receive lines. The network interface unit includes a passive resistance circuit in the receive direction path that allows monitoring of signals from a central office in the presence of open circuit reflection or noise from the customer premises.

18 Claims, 4 Drawing Sheets

Fig. 7

BRIDGE FOR A NETWORK INTERFACE UNIT

BACKGROUND OF THE INVENTION

The present invention relates generally to interface units on digital transmission line systems and, more particularly, to a Network Interface Unit ("NIU") that may report its status to a remote facility. Thus, for example, the invention assists a telephone company technician in identifying, from a central office, the location of a break in a digital transmission line.

NIUs are typically located at the interface between a digital transmission line and a customer premises and usually serve as the demarcation between a telephone company line and a customer premises. In general operation, when an NIU receives a signal on the digital transmission line from the central office, the NIU, in turn, transmits that signal to equipment on the customer premises. Similarly, when the NIU receives a signal from the customer premises, the NIU transmits that signal to the central office on the digital transmission line.

The present invention may be used with digital transmission lines generally, including, for example, the Regional Bell Telephone Systems in the United States. As is discussed in Pesetski and Arnone U.S. patent application Ser. No. 07/943,859, filed Sep. 11, 1992, the Bell Telephone System has widely utilized time multiplexed pulse code modulation systems. Such systems have generally been designated as "T carriers." The first generation of multiplexers designed to feed the T1 system was the D1 channel bank. Channel banks have evolved through the D5 series. The "D" channel bank provides multiple DS-1 signals that are carried on the T1 systems. Each T1 system carries twenty-four two-way channels on two pairs of exchange grade cables. One pair of cables provides communication in each direction. The information on such a pulse code modulated system is transmitted in the form of bipolar or alternate mark inversion (AMI) pulses.

The data to be transmitted over the cables, such as speech, may be sampled at a rate of 8,000 Hertz, and the amplitude of each signal is measured. The amplitude of each sample is compared to a scale of discrete values and assigned a numeric value. Each discrete value is then encoded into a binary form. Representative binary pulses appear on the transmission lines.

As discussed in Sheets U.S. patent application Ser. No. 07/844,129 filed Mar. 2, 1992, the data, or "payload," signals on such transmission lines are typically sent differentially on a Tip-Ring pair. Payload signals are received by the telephone company central office and, generally, are transmitted, via cables, to a series of regenerative signal repeaters ("line repeater" or "signal repeater"). Such repeaters are spaced along the cables approximately every 6,000 feet. The first repeater receives the data from the central office, but, because of transmission line losses, noise, interference, and distortion, the signal will have degenerated. The repeater recognizes the presence or absence of a pulse at a particular point in time and, thereafter, if appropriate, regenerates, or "builds up," a clean, new pulse. A regenerative repeater is powered by the transmission cable itself to generate the new pulses. The new pulses are transmitted by the line repeater along more cable to either another line repeater or to an NIU.

As further explained in Sheets U.S. patent application Ser. No. 07/844,129 filed Mar. 2, 1992, some "intelligent" line repeaters also include a "dead loop" feature. In this mode, a break in the transmission line or a disconnection of the customer's equipment from the NIU causes the line repeater or the NIU to "dead loop," such that any signal transmitted from the central office is simply rerouted back to the central office. Accordingly, the central office is advised of the abnormality along the transmission cables. The "dead loop" condition may be released if, for example, the line is corrected or the customer's equipment is reconnected to the NIU.

As further noted in Sheets U.S. patent application Ser. No. 07/844,129 filed Mar. 2, 1992, NIUs commonly have the capability to identify errors in the data received over the cable and responsively provide a signal to the central office that the errors have occurred. Errors that can be detected by the NIU include, for example, errors in signaling, format, bipolar violations, out of frame data, or loss of signal, as well as the disconnection of equipment by the customer.

NIUs may include regeneration toward the customer premises. Similarly, the NIU may include regeneration in the opposite direction. The NIU may also include analog to digital circuitry to convert an analog signal from the customer premises to a digital signal for the central office.

For clarification and simplification of terminology, the pair of cables carrying signals from the central office to the NIU is designated as a "network receive" line, and the pair of cables transmitting data from the NIU is designated as the "network transmit" line. These designations are conventions in telecommunications defining directions relative to the end customer. Similarly, the two pairs of lines carrying signals to and from the NIU to the customer premises is designated as the "customer premises" lines.

NIUs may also include a "loopback" feature that allows the central office to ascertain whether or not a particular span of cable provides continuity along its entire length. For example, the central office may send, via the digital transmission lines, an activating signal, which does not interfere with normal transmission operations, that designates the NIU to "loop back" a signal to the central office. If no break is present on transmission lines, the NIU will receive the signal on the network receive line, and transmit a loopback signal to the central office on the network transmit line.

If, however, the digital transmission line has a break on either the network receive line, network transmit line, or both, then the central office will not receive a loopback signal in response to an activating signal. That is, if a break is present on the network receive line, the NIU will never receive an activating signal, or if a break is present on the transmit line, the central office will never receive a loopback signal on the network transmit line. Use of a loopback feature with repeaters is discussed in Garcia U.S. Pat. No. 5,224,149, issued Jun. 29, 1993.

In some instances, the activating signal for an NIU loopback becomes distorted, interrupted, or lost. In addition, false loopback signals may render the loopback procedure worthless for identifying the location of breaks in transmission lines.

These types of problems may occur because the loopback circuitry is coupled not only to the network receive lines, but also to the customer premises lines. Thus, a signal on the customer premises line may interfere with the loopback procedure. For example, a voltage on the customer premises lines may cause the NIU to transmit an unprompted loopback signal to the central office. Similarly, a voltage on the customer premises line may interfere with loopback circuitry and disrupt the loopback procedure.

One source of voltage on the customer premises line is open circuit reflection. An open circuit may appear on the customer premises line if, for example, lines are in the process of being installed in the customer premises, a customer disconnects equipment from the NIU, or there is a broken line within the customer premises. If the customer premises lines are an open circuit, open circuit reflection may occur, for example, if the length of the open circuit customer premises line is equal to one fourth of the wavelength of the signal from the central office. Similarly, where the length of the customer premises line is equal to the wavelength of the signal from the central office divided by four and multiplied by $(2n+1)$, where n is a positive integer, open circuit reflection may cause a voltage null on the input of the sensing regenerator in the loopback circuitry.

One past method of addressing the problem of open circuit reflection has been to couple a high output impedance amplifier on the line from the NIU to the customer premises. This method is not desirable because it consumes current and is a power drain, and incurs the expense of a high output impedance amplifier in each NIU. Worse still, with the loss of local power, the output amplifier would not function and the transmission would be blocked in the receive direction.

Many of the concepts discussed in this background are further explained in Tarbos U.S. Pat. No. 3,568,100, issued Mar. 2, 1971, Garcia U.S. Pat. No. 5,224,149, issued Jun. 29, 1993, Pesetski and Arnone U.S. patent application Ser. No. 07/943,859, filed Sep. 11, 1992, and Sheets U.S. patent application Ser. No. 07/844,129, filed Mar. 2, 1992.

SUMMARY OF THE INVENTION

In a preferred embodiment of the invention, a network interface unit ("NIU") is interconnected between a network span and a customer premises. The network span comprises two pairs of digital transmission lines. One pair of lines carries signals from the central office to the NIU (receive direction), and one pair of lines carries signals from the NIU to the central office (transmit direction). Two pairs of lines carry signals to and from the NIU and the customer premises. The central office may test the continuity of the network span by transmitting an activating signal to the NIU, which the NIU loops back to the central office.

A passive resistance and amplification means is coupled between the two pairs of network lines and the monitoring so that a voltage on the customer premises lines will not falsely cause the NIU to transmit a signal to the central office, nor will a voltage on the customer premises lines interfere with an activating signal sent to the NIU from the central office.

Thus, an object of the present invention is an improved testing system for digital transmission lines. Another object of the present invention is a passive element for reducing problems caused by open circuit reflection on the customer premises lines. Yet another object of the present invention is a passive dement for reducing problems caused by a voltage on the customer premises lines. A further object of the present invention is a passive dement for reducing problems caused by voltages on the customer premises lines that does not consume excess power. Yet another object of the present invention is a passive element for reducing problems caused by voltages on the customer premises lines that has a fast response time and that will allow for normal transmission with the loss of local power.

Yet another object of the present invention is a testing system that is simpler, more reliable, and less expensive. These and other objects, features, and advantages of the present invention are discussed or are apparent in the following detailed description.

BRIEF DESCRIPTION OF THE DRAWINGS

Preferred embodiments of the present invention are described herein with reference to the drawing wherein.

DETAILED DESCRIPTION OF THE PREFERRED EMBODIMENTS

Figure 1:
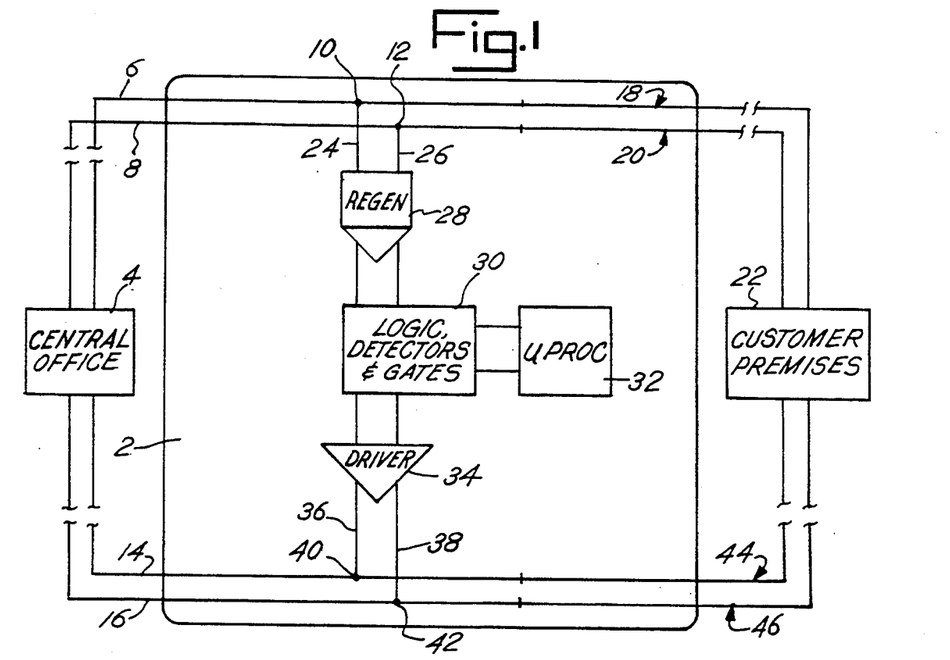
FIG. 1 is a block diagram of a prior art NIU.

FIG. 1 is a pictorial representation of a prior art network interface unit ("NIU") 2. A NIU 2 receives signals from a central office 4 on a network receive line 6 and a network receive line 8, which are coupled to the NIU 2 at a node 10 and a node 12, respectively. The NIU 2 transmits signals to the central office 4 on a network transmit line 14 and a network transmit line 16.

The designations of "network transmit" and "network receive" lines are, of course, arbitrary and labelled as shown in FIGS. 1–7 only for convenience. A "network transmit" line becomes a "network receive" line if the observer merely changes relative position.

A customer premises line 18 and a customer premises line 20 are also coupled to the node 10 and the node 12, respectively. In normal operation, the customer premises lines 18 and 20 are coupled to a customer premises 22. Also coupled to the nodes 10 and 12 are a regenerator input line 24 and a regenerator input line 26, respectively. The regenerator input lines 24 and 26 are coupled to a regenerator 28, the output of which is coupled to logic detectors and gates 30. The logic detectors and gates 30 are controlled by a microprocessor 32. The output of the logic detectors and gates 30 is amplified by a driver 34, and the output of the driver 34 is coupled to a driver output line 36 and a driver output line 38. The driver output lines 36 and 38 are coupled to the network transmit lines 14 and 16, at a node 40 and a node 42, respectively. A customer premises line 44 and a customer premises line 46 couple the customer premises 22 to the NIU 2 at the nodes 40 and 42, respectively.

In normal communication operation, the NIU 2 receives, on network receive lines 6 and 8, signals from the central office 4. These signals appear at the customer premises 22 on customer premises lines 18 and 20. Similarly, the customer premises 22 transmits signals to the NIU 2 on the customer premises lines 44 and 46. Customer premises lines 44 and 46 are coupled, at the nodes 40 and 42, to the network transmit lines 14 and 16, respectively, which provide a signal to the central office 4.

It should be noted that additional components or circuitry may appear between the nodes 10 and 12 and the customer premises 22, between the customer premises 22 and the nodes 40 and 42, between the nodes 40 and 42 and the central office 4, and between the central office 4 and the nodes 10 and 12. For example, regenerative signal repeaters (not pictured) may be spaced along network receive lines 6 and 8 between the central office 4 and the NIU 2. Accordingly, customer premises lines 18, 20, 44, and 46, network transmit lines 14 and 16, and network receive lines 6 and 8 are all depicted with a slash mark. This mark does not necessarily indicate a break in the line.

As was discussed in the background of the invention, when a test is conducted to determine the continuity of the transmission lines, the central office 4 transmits an activating signal to the NIU 2 on the network receive lines 6 and 8. The network receive lines 6 and 8 are coupled to the regenerator input lines 24 and 26, so the received signal is regenerated, processed and amplified by the regenerator 28, the logic detectors and gates 30 and the driver 34. The output lines of the driver 34, the driver output lines 36 and 38, are coupled to the network transmit lines 14 and 16 at the nodes 40 and 42, respectively. Thus, in response to an activating signal, the central office 4 receives a loopback signal on the network transmit lines 14 and 16.

If a break exists anywhere on the network receive lines 6 and 8 or the network transmit lines 14 and 16, the central office 4 will not receive a loopback response to its activating signal. Accordingly, a technician is able to determine the location of a break in the digital transmission lines by sending activating signals to the NIUs.

Figure 2:
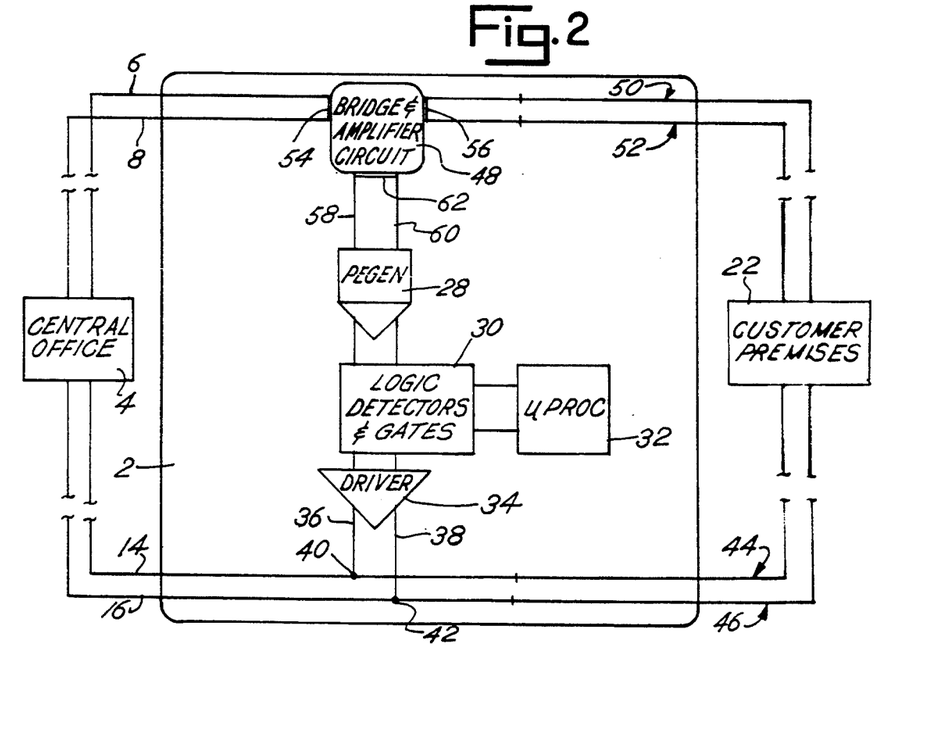
FIG. 2 is a block diagram of an NIU incorporating a passive bridge and amplifier circuit according to the invention.

Referring to FIG. 2, an embodiment of the present invention is shown as the NIU 2. The NIU 2 receives signals from the central office 4 via the network receive lines 6 and 8. The network receive lines 6 and 8 are coupled to a bridge and amplifier circuit 48 at a Port A 54. Also coupled to the bridge and amplifier circuit 48 are a customer premises line 50 and a customer premises line 52. The customer premises lines 50 and 52 are coupled to the bridge and amplifier circuit 48 at a Port B 56. Again, additional components or circuitry may appear between the nodes 10 and 12 and the customer premises 22, therefore customer premises lines 50 and 52 are depicted with a slash.

An output segment line 58 and an output segment line 60 are also coupled to the bridge and amplifier circuit 48 at a Port C 62. The output segment lines 58 and 60 are also coupled to the regenerator 28. The regenerator 28 regenerates a signal present on the output segment lines 58 and 60, and the signal is further processed by the logic detectors and gates 30. The logic detectors and gates 30 are controlled by the microprocessor 32. The output of the logic detectors and gates 30 is amplified by the driver 34 and coupled to the driver output lines 36 and 38. The driver output lines 36 and 38 are coupled to the network transmit lines 14 and 16.

In a preferred embodiment, the output segment lines 58 and 60 (Port C) comprise an output segment. The term "output segment" refers to the output of the bridge and amplifier circuit, although the term "output" is arbitrary and is used for convenience. From the perspective of the regenerator 28, the output segment lines 58 and 60 are input lines.

Figure 3:
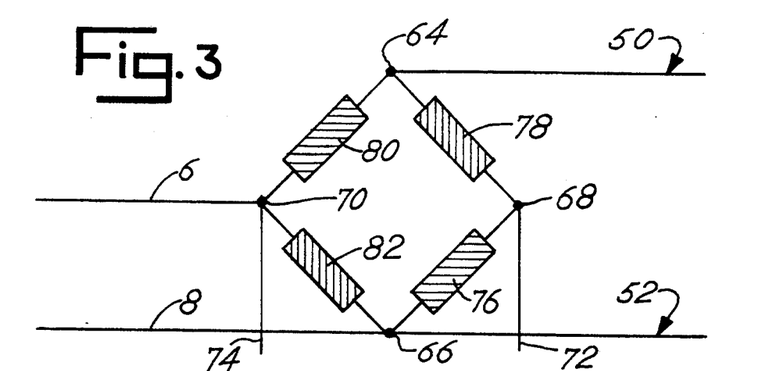
FIG. 3 is a schematic diagram of the passive bridge circuit.

FIG. 3 depicts schematically the passive bridge circuit portion of the bridge and amplifier circuit 48 in FIG. 2. The network receive lines 6 and 8 provide a signal from the central office 4 (not pictured in FIG. 3) to the passive bridge circuit at a node 70 and a node 66, respectively. The customer premises lines 50 and 52 are coupled to the bridge circuit at a node 64 and the node 66, respectively. Thus, the network receive line 8 is coupled to the customer premises line 52 at the node 66. Also coupled to the passive bridge circuit, at a node 68 and the node 70, are a passive bridge output line 72 and a passive bridge output line 74, respectively. Thus, the passive bridge output line 74 is coupled directly, at the node 70, to the network receive line 6.

Figure 7:
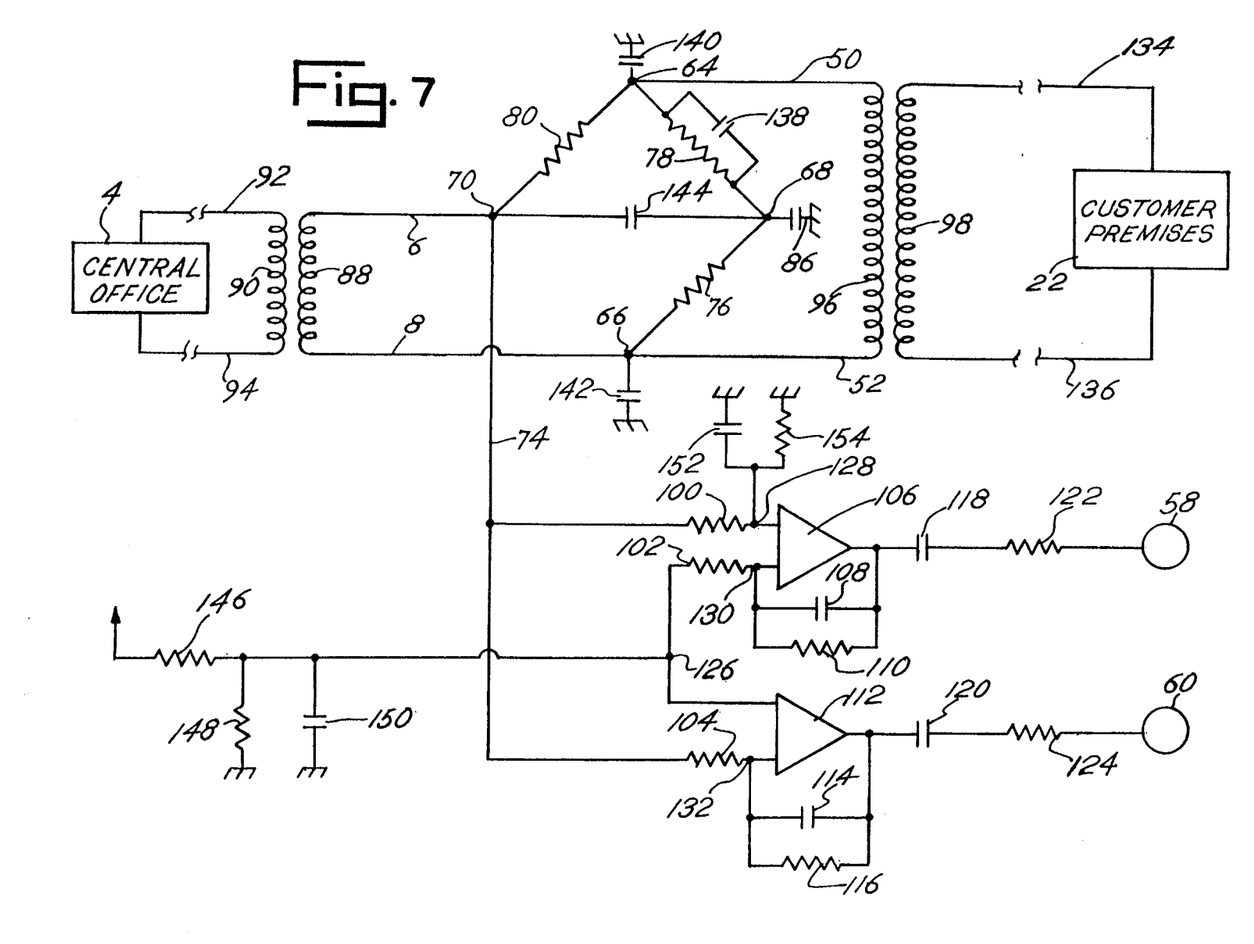
FIG. 7 is a schematic diagram of the passive bridge circuit and amplification means.

It should be understood that in certain configurations, the passive bridge output lines 72 and 74 are coupled directly to the regenerator 28, shown in FIG. 2. In such a configuration, the passive bridge output lines 74 and 72 are the same lines as the output segment lines 58 and 60, respectively, depicted in FIG. 2. As depicted in FIG. 7, however, the passive bridge output line 74 may also feed an amplification circuit before being coupled to the regenerator 28. In this case, the signal present on the passive bridge output lines 72 and 74 is modified before the signal appears on the output segment lines 58 and 60. The amplification circuit is further discussed later in this description.

Referring again to FIG. 3, a resistor 76 is coupled between the node 66 and the node 68, a resistor 78 is coupled between the node 68 and the node 64, a resistor 80 is coupled between the node 64 and the node 70, and a resistor 82 is coupled between the node 70 and the node 66. In a preferred embodiment, the resistor 82 has a resistance of R ohms, the resistor 80 has a resistance of $\alpha R$ ohms, the resistor 78 has a resistance of $\alpha \beta R$ ohms, and the resistor 76 has a resistance of $\alpha R$ ohms. Therefore, the resistance between the node 64 and the node 66, in other words the resistance on the customer premises lines, equals $R(1+\alpha)\beta/(1+\beta)$. If this resistance is set equal to the resistance between the node 70 and the node 66, in other words the network line resistance, then $\beta = 1/\alpha$. Accordingly, the resistance of the resistor 76 is $R/\alpha$, the resistance of the resistor 78 is R, the resistance of resistor 80 is $R\alpha$ and the resistance of resistor 82 is R. Therefore the resistance between the node 68 and the node 70 is $[R(1+\alpha) \ R(1+1/\alpha)]/[R(1+\alpha)+R(1+1/\alpha)]$, which equals R.

As previously discussed, the customer premises lines 50 and 52, in normal operation, are coupled to the customer premises 22 (not pictured in FIG. 3), and no voltage is generated by the customer premises 22 on the customer premises lines 50 and 52. Accordingly, in normal operation, no voltage is present between the node 64 and the node 66.

In normal communication operation, the NIU 2 receives, on network receive lines 6 and 8, signals from the central office 4. These signals appear at the nodes 70 and 66. The customer premises line 50 is coupled to the node 64 and the customer premises line 52 is coupled to the node 66. Thus, the voltage drop of the signal between the node 70 and the node 64, or across the resistor 80, depends on the resistance values of the resistor 80 and the resistance of the customer premises 22. The voltage at the node 64 is proportional to the voltage on the network receive lines 6 and 8. Not shown in FIG. 3 are customer premises lines 44 and 46 which couple the output of the customer premises 22 to the NIU 2 and the network transmit lines 14 and 16.

When a test is conducted to determine the continuity of the network receive lines 6 and 8 and the network transmit lines 14 and 16, the central office 4 transmits an activating signal to the NIU 2 on the network receive lines 6 and 8. The signal on the network receive line 6 appears on the passive bridge output line 74 because the two lines are coupled at the node 70. The voltage on the network receive lines 6 and 8 appears as the voltage between the node 70 and the node 66. The resistor 82 is interconnected between the node 70 and the node 66, therefore the voltage between the network receive lines 6 and 8 is across the resistor 82. Similarly, the voltage across the resistors 80, 78 and 76 is the voltage between the network receive lines 6 and 8. Accordingly, the voltage between the node 70 and the node 68 depends on the resistance of the resistors 80 and 78 and is a proportion of the voltage on the network receive lines 6 and 8.

As a result, the voltage swings on the passive bridge output line 74 are only a fraction of the voltage swings on the network receive lines 6 and 8. Using the resistance values discussed above, and assuming a voltage V on the network receive lines 6 and 8, the voltage drop along the resistor 80 is $\alpha V$, the voltage drop along the resistor 78 is $\alpha V$, the voltage drop along the resistor 76 is $(1-2\alpha)V$, and the voltage drop between the node 68 and the node 70 is $2\alpha$ V. Thus, the voltage on the passive bridge output lines 72 and 74 is $2\alpha$ V. Accordingly, the lower voltages allows for faster operation and also permits the use of less expensive components.

Although not shown in FIG. 3, the result of a signal on the passive bridge output lines 72 and 74 is a signal on the output segment line 58 and 60, and a signal on the network transmit lines 14 and 16. In sum, in response to an activating signal from the central office 4, the central office 4 receives a loopback signal on the network transmit lines 14 and 16. If a breaks exists anywhere on the network receive lines 6 and 8 or the network transmit lines 14 and 16, the central office 4 will not receive a response to its activating signal.

As discussed in the Background of the Invention, when the customer premises 22 is not connected to the customer premises lines 50 and 52, these lines are an open circuit. This situation may occur, for example, when there is no equipment attached to the customer premises lines 50 and 52. If the customer premises lines 50 and 52 have certain characteristics, an open circuit reflection may cause a voltage to be present on the customer premises lines 50 and 52. Thus, a voltage may exist between the node 64 and the node 66. Due to the relationship of resistance values of the resistors 78 and 80, discussed above, the voltage drop from the node 64 to the node 68 is the same as the voltage drop from the node 64 to the node 70. Thus, the voltage at the node 70 is the same as the voltage at the node 68, and, consequently, no signal is present on the passive bridge output lines 72 and 74. Thus, the open circuit reflection signal does not cause a signal to be sent to the central office 4, nor does open circuit reflection interfere with activating signals sent from the central office.

Figure 4:
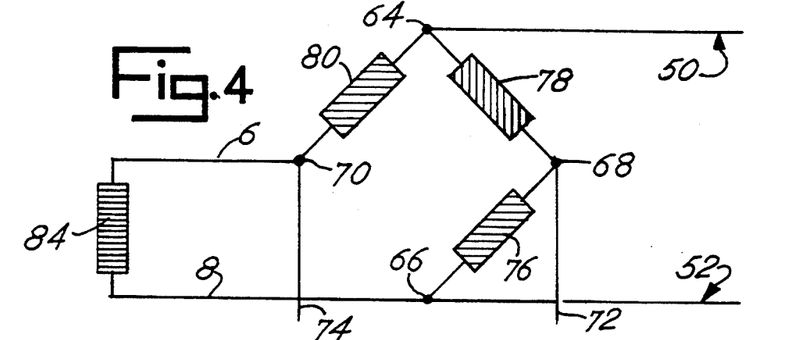
FIG. 4 is a schematic diagram of a preferred embodiment of the passive bridge circuit.

FIG. 4 depicts a preferred embodiment of the passive bridge circuit, similar to that shown in FIG. 3, where $\alpha<<1$. The resistance of the network is figuratively depicted as a resistor 84.

Figure 5:
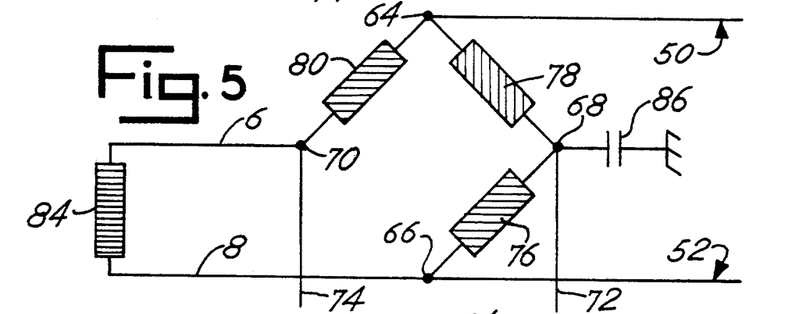
FIG. 5 is a schematic diagram of the preferred embodiment of FIG. 4 with a capacitor for matching the impedance of the digital transmission line.

FIG. 5 depicts the passive bridge circuit similar to that shown in FIG. 4. A capacitor 86 is coupled to the node 68 of the passive bridge circuit. The capacitor 86 is to reduce circuit noise and is grounded.

Figure 6:
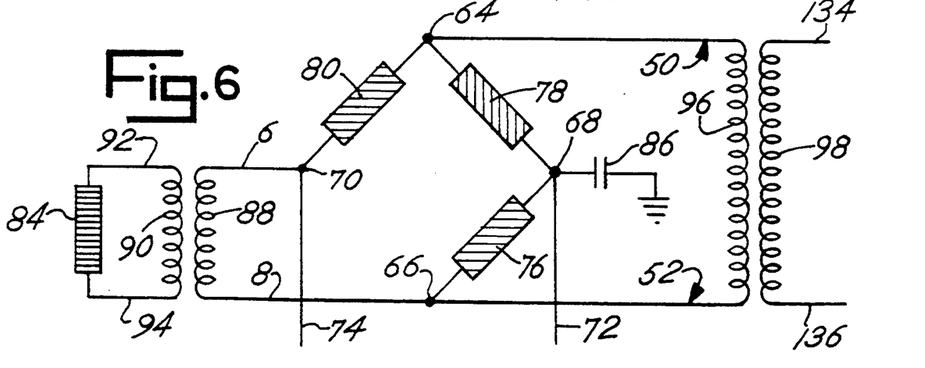
FIG. 6 is a schematic diagram of a passive bridge circuit and amplification means including a representation of a digital transmission line network and an output from the NIU to a customer premise.

FIG. 6 shows the passive bridge circuit similar to that shown in FIG. 5. The resistance of the network is figuratively shown as the resistor 84. Network receive lines 6 and. 8 are shown coupled to an isolating transformer 88 that is matched to an isolating transformer 90. The isolating transformer 90 is coupled to a network receive line 92 and a network receive line 94. The customer premises lines 50 and 52 are shown coupled to an isolating transformer 96 that is matched to an isolating transformer 98. The isolating transformer 98 is coupled to a customer premises line 134 and a customer premises line 136.

A passive bridge and amplifier circuit is depicted in FIG. 7. The network receive lines 6 and 8 are shown coupled to the isolating transformer 88 that is matched to the isolating transformer 90. The isolating transformer 90 is coupled to the network receive line 92 and the network receive line 94, which are coupled to the central office 4. The customer premises lines 50 and 52 are shown coupled to the isolating transformer 96 that is matched to the isolating transformer 98. The isolating transformer 98 is coupled to a customer premises line 134 and a customer premises line 136 which are coupled to the customer premises 22. As discussed previously, additional components or circuitry may appear between the customer premises lines 134 and 136 and the customer premises 22, and between the central office 4 and the network receive lines 92 and 94. Accordingly, customer premises lines 134 and 136 and network receive lines 92 and 94 are depicted with a slash mark. This mark does not necessarily indicate a break in the line.

The network receive lines 6 and 8 provide a signal from the central office 4 to the passive bridge circuit at the node 70 and the node 66, respectively. The customer premises lines 50 and 52 are coupled to the bridge circuit at the node 64 and the node 66, respectively. Thus, the network receive line 8 is coupled to the customer premises line 52 at the node 66. Also coupled to the passive bridge circuit, at the node 70, is a passive bridge output line 74. Thus, the passive bridge output line 74 is coupled directly, at the node 70, to the network receive line 6.

The resistor 76 is coupled between the node 66 and the node 68, a resistor 78 is coupled between the node 68 and the node 64, and a resistor 80 is coupled between the node 64 and the node 70. A capacitor 138 improves the effectiveness of the circuit by matching the capacitance of the network. The capacitor 138 is connected in parallel with the resistor 78. A capacitor 140 is coupled to the node 64 to reduce circuit noise. The capacitor 140 is grounded. Similarly, a capacitor 142 is coupled to the node 66 to reduce circuit noise. The capacitor 142 is grounded. A capacitor 86 is also coupled to the node 68 of the passive bridge circuit. The capacitor 86 is to reduce circuit noise and is grounded. A capacitor 144 is coupled between the node 70 and the node 68.

The passive bridge output line 74 is generally coupled to amplification circuitry with the output segment lines 58 and 60. The amplification circuitry includes a resistor 146 coupled in parallel with a resistor 148 and also coupled in parallel with a capacitor 150 to a node 126. The resistor 146 is also coupled to a reference voltage. A noninverting input to an amplifier 112 is also coupled to the node 126. A resistor 102 is coupled between the node 126 and a node 130. An inverting input to an amplifier 106 is also coupled to the node 130. A capacitor 108 and a resistor 110 are coupled in parallel between the node 130 and the output of the amplifier 106. The output of the amplifier 106 is coupled in series with the capacitor 118 and the resistor 122 to the output segment line 58.

The passive bridge output line 74 is coupled in parallel to a resistor 100 and a resistor 104. The resistor 100 is coupled to a node 128. A capacitor 152 and a resistor 154 are coupled in parallel to the node 128. A noninverting input of the amplifier 106 is also coupled to the node 128. The resistor 104 is coupled to a node 132. A inverting input to the amplifier 112 is coupled to the node 132. A capacitor 114 and a resistor 116 are coupled in parallel between the node 132 and the output of the amplifier 112. The output of the amplifier 112 is coupled in series to a capacitor 120 and a resistor 124 to the output segment line 60. The resistor 148, the resistor 154, the capacitor 150, and the capacitor 152 are coupled to ground. In sum, when a signal is present on the passive bridge output line 74, an amplified signal appears on the output segment lines 58 and 60.

In a preferred embodiment of the invention, the resistor 146 has a resistance of 4.99 k ohms, the resistor 148 has a resistance of 4.99 k ohms, the capacitor 150 has a capacitance of 1 microfarad, and the resistor 100 has a resistance of 100 ohms. Furthermore, in this preferred embodiment, the resistor 102 has a resistance of 100 ohms, the resistor 104 has a resistance of 100 ohms, the resistor 122 has a resistance of 1.2 k ohm, and the resistor 124 has a resistance of 1.2 k ohm. In addition, the capacitor 118 has a capacitance of 0.1 microfarads, the capacitor 120 has a capacitance of 0.1 microfarads, the capacitor 152 has a capacitance of 270 picofarads, and the resistor 154 has a resistance of 1.2 k ohms. Also, the resistor 80 has a resistance of 2 ohms, the resistor 78 has a resistance of 100 ohms, the resistor 76 has a resistance of 5.49 k ohms, and the capacitor 138 has a capacitance of 390 picofarads. Continuing, the capacitor 86 has a capacitance of 0.47 microfarads, the capacitor 144 has a capacitance of 470 picofarads, the capacitor 108 has a capacitance of 270 picofarads, and the resistor 110 has a resistance of 1.2 k ohms. Furthermore, the capacitor 114 has a capacitance of 270 picofarads, and the resistor 116 has a resistance of 1.2 k ohms. The resistor 146 is coupled to a 5 volt power supply.

The preceding demonstrates passive resistance means between a customer premises and a network span in a network interface unit. One embodiment of the invention includes a first and a second customer node, a first and a second network node, and a first and a second output node. In a preferred embodiment, the network span is comprised of network transmit lines and network receive lines and the network interface unit is a telephone network interface unit. Further, in a preferred embodiment, the network transmit lines the network receive lines are digital transmission lines.

Figure 8:
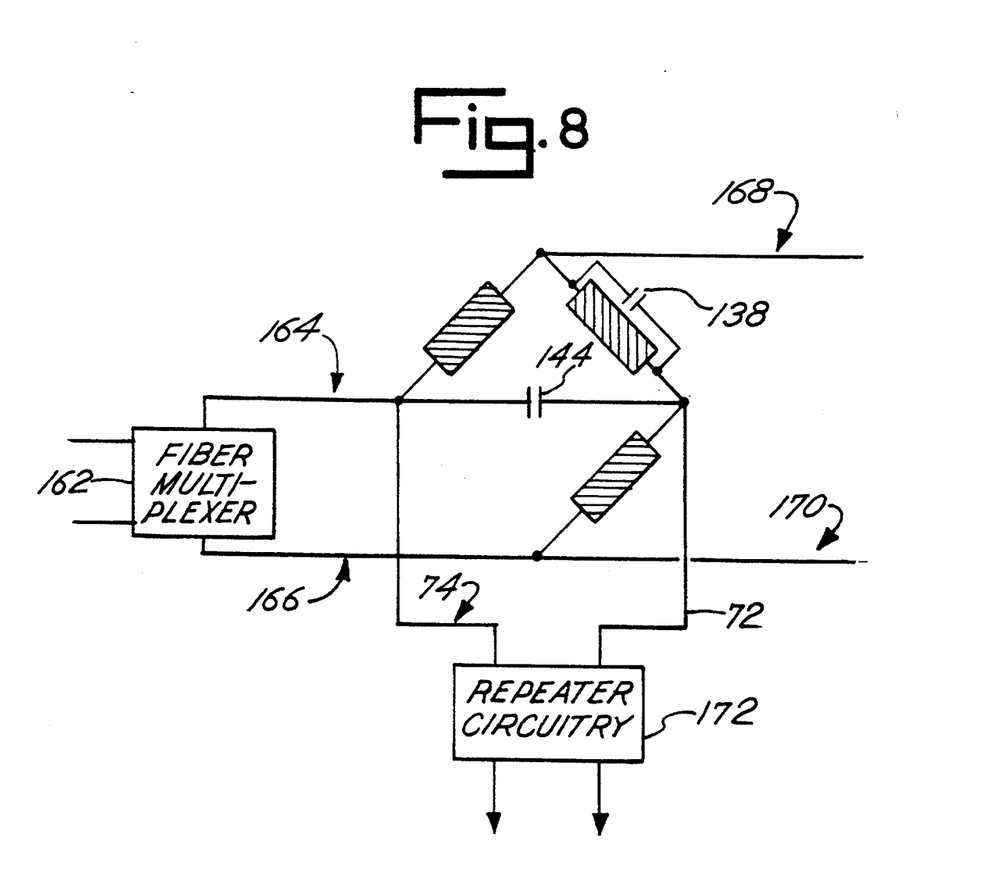
FIG. 8 is a schematic diagram of the passive bridge circuit in an office repeater.

It is to be understood, however, that alternative forms of the described embodiments are covered by the full scope of equivalents of the claimed invention. As one example only, the bridge circuit may also be used in an office repeater, as shown in FIG. 8. The office repeater may be connected between a network receive line 168 and a network receive line 170 and a fiber multiplexer 162. The fiber multiplexer 162 is coupled to the bridge circuit by a fiber multiplexer output line 164 and a fiber multiplexer output line 166. The passive bridge output lines 72 and 74 may be coupled to repeater circuitry 172. The passive bridge circuit will prevent reflection or other signals on the network receive lines 168 and 170 from interfering or distorting the signal on the passive bridge output lines 72 and 74.

Generally, repeater circuitry such as the repeater circuitry 172 modifies and regenerates a signal that was transmitted along 2,500 to 5,000 feet of cable. Accordingly, the repeater circuitry 172 is designed to process a signal that is degraded due to cable loss. As shown in FIG. 8, the bridge circuit may be configured to simulate such cable loss, and thus allow normal operation of the repeater circuitry. First, the bridge circuit attenuates the signal on the passive bridge output lines 72 and 74 relative to the fiber multiplexer output lines 164 and 166.

In addition, the capacitor 138 and the capacitor 144 may be used to roll off pulses and further simulate cable loss characteristics. To particularly point out and distinctly claim the subjects regarded as the invention, the following claims conclude this specification.

We claim:

1. A network interface unit, interconnected between a network span and a premises segment, said network interface unit comprising:
   an output segment;
   first and second customer nodes, interconnected to said premises segment;
   first and second output nodes, at least one of said output nodes being interconnected to said output segment;
   a first passive impedance between said first output node and said first customer node;
   a second passive impedance between said second output node and said second customer node; and
   a third passive impedance between said first customer node and said second output node;
   said first, second and third passive impedances cooperatively defining balancing means for dividing a reflected signal from said first and second customer nodes between said first and third passive resistances and substantially preventing said reflected signal from being provided to said first and second output nodes.

2. A network interface unit as claimed in claim 1 wherein said network span comprises digital receive lines.

3. A network interface as claimed in claim 2 wherein said network interface unit further includes capacitance means, in parallel with said third passive impedance, for substantially nullifying parasitic capacitance.

4. A network interface unit as claimed in claim 1 wherein said output segment is coupled to amplification means.

5. An office repeater, interconnected between digital network receive lines and a multiplexer, said office repeater comprising:
   repeater circuitry;
   first and second customer nodes, interconnected to said premises segment;
   first and second output nodes, at least one of said output nodes being interconnected to said repeater circuitry;

a first passive impedance between said first output node and said first customer node;

a second passive impedance between said second output node and said second customer node; and a third passive impedance between said first customer node and said second output node;

said first, second and third passive impedances cooperatively defining balancing means for dividing a reflected signal from said first and second customer nodes between said first and third passive impedances and substantially preventing said reflected signal from being provided to said first and second output nodes.

6. An office repeater as claimed in claim 5 wherein said office repeater includes capacitance means, in parallel with said third passive impedance, for simulating cable loss characteristics.

7. An office repeater as claimed in claim 5 wherein said multiplexer is a fiber multiplexer.

8. A network interface unit as claimed in claim 2 wherein said network receive span substantially presents a resistance of R ohms to said network interface unit and wherein said first impedance has a value of approximately $\alpha R$ ohms, said second impedance has a value of approximately $\beta R$ ohms, and said third impedance has a value of approximately $\alpha \beta R$ ohms, where $\alpha$ and $\beta$ are constants.

9. A network interface unit as claimed in claim 8 wherein R defines a nominal value of approximately 100 ohms and wherein $\alpha$ has a value of approximately $1/\beta$.

10. A network interface unit as claimed in claim 5 wherein said network receive lines substantially present a resistance of R ohms to said office repeater and wherein said first impedance has a value of approximately $\alpha R$ ohms, said second impedance has a value of approximately $\beta R$ ohms, and said third impedance has a value of approximately $\alpha \beta R$ ohms, where $\alpha$ and $\beta$ are constants.

11. A network interface unit as claimed in claim 10 wherein R defines a nominal value of approximately 100 ohms and wherein $\alpha$ has a value of approximately $1/\beta$.

12. A network interface unit coupled to a network receive span and a customer premises receive span, said network interface unit comprising:

logic circuitry for analysis of a loopback signal;

a first port coupled to said network receive span;

a second port coupled to said customer premises receive span;

a third port coupled to said logic circuitry; and bridge circuit means for providing, in response to a first signal on said first port, related signals to said second and third ports and for dividing a second signal from said second port among said resistance devices, whereby said second signal is not transmitted to said third port and said logic circuitry, said bridge circuit means including a first passive impedance coupling said first and second ports, a second passive impedance coupling said first and third ports, and a third passive impedance coupling said second and third ports.

13. A network interface unit as claimed in claim 12 wherein said network receive span comprises digital network receive lines.

14. A network interface unit as claimed in claim 13 wherein said network interface unit further includes balancing capacitance matching means, in parallel with said third passive impedance, for substantially nullifying parasitic capacitance.

15. A network interface unit as claimed in claim 13 wherein said first, second, and third impedances are, respectively, first, second, and third resistors.

16. A network interface unit as claimed in claim 15 wherein said network receive span substantially presents a resistance of R ohms to said network interface unit and wherein said first impedance has a value of approximately $\alpha R$ ohms, said second impedance has a value of approximately $\beta R$ ohms, and said third impedance has a value of approximately $\alpha \beta R$ ohms, where $\alpha$ and $\beta$ are constants.

17. A network interface unit as claimed in claim 16 wherein R defines a nominal value of approximately 100 ohms and wherein $\alpha$ has a value of approximately $1/\beta$.

18. A network interface unit, coupled to first and second network receive lines and first and second customer premises receive lines, said network receive lines defining a network resistance, said network interface unit comprising:

a repeater having first and second repeater lines;

first, second and third resistors;

first and second output nodes, said first output node defining a first network receive node, said first output node being coupled to said first network receive line, said second repeater line, and said first resistor, said second output node being coupled to said first repeater line and said second and third resistors;

first and second customer nodes, said second customer node defining a second network receive node, said first customer node being coupled to said first customer premises receive line and said first and third resistors, said second customer node being coupled to said second customer premises receive line and said second resistor;

said bridge circuit, in response to a first voltage between said first and second network nodes, producing related voltages between said first and second customer nodes and between said first and second output nodes, and said bridge circuit, in response to a second voltage between said first and second customer nodes, balancing said second voltage between (1) said first resistor and said network resistance and (2) said second and third resistors to apply substantially equal portions of said second voltage at said first and second output nodes;

said first and second network receive nodes presenting to said network interface unit a nominal resistance between them of approximately 100 ohms, said first resistor having a value of approximately $\alpha 100$ ohms, said second resistor having a value of approximately $\beta 100$ ohms, and said third resistor having a value of approximately 100 ohms, where $\alpha$ and $\beta$ are constants and $\alpha$ is substantially smaller than $\beta$.

* * * * *

UNITED STATES PATENT AND TRADEMARK OFFICE
CERTIFICATE OF CORRECTION

PATENT NO. : 5,444,776
DATED : August 22, 1995
INVENTOR(S) : Sheets et al.

It is certified that error appears in the above-identified patent and that said Letters Patent is hereby corrected as shown below:

Column 6,
Line 43, "$\alpha R$" should be replaced by -- $\beta R$ --.
Line 53, the hyphen at the end of the line should be deleted.

Signed and Sealed this

Twelfth Day of August, 2003

JAMES E. ROGAN
*Director of the United States Patent and Trademark Office*